__(12)__ United States Patent
Kikuchi et al.

(10) Patent No.: US 9,902,792 B2
(45) Date of Patent: Feb. 27, 2018

(54) DISPERSION-TYPE ACRYLIC COPOLYMER

(71) Applicant: Mitsubishi Rayon Co., Ltd., Chiyoda-ku (JP)

(72) Inventors: Saori Kikuchi, Otake (JP); Eiko Okamoto, Otake (JP); Hiroshi Niino, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 179 days.

(21) Appl. No.: 14/912,531

(22) PCT Filed: Aug. 20, 2014

(86) PCT No.: PCT/JP2014/071746
§ 371 (c)(1),
(2) Date: Feb. 17, 2016

(87) PCT Pub. No.: WO2015/025876
PCT Pub. Date: Feb. 26, 2015

(65) Prior Publication Data
US 2016/0200846 A1     Jul. 14, 2016

(30) Foreign Application Priority Data

Aug. 20, 2013 (JP) .................. 2013-170701

(51) Int. Cl.
| | | |
|---|---|---|
| *C08F 220/28* | (2006.01) |
| *C08J 5/18* | (2006.01) |
| *C08L 33/14* | (2006.01) |
| *C08F 290/06* | (2006.01) |
| *C08F 220/14* | (2006.01) |

(52) U.S. Cl.
CPC .......... *C08F 220/28* (2013.01); *C08F 220/14* (2013.01); *C08F 290/062* (2013.01); *C08J 5/18* (2013.01); *C08L 33/14* (2013.01); *C08F 2220/285* (2013.01); *C08J 2333/00* (2013.01); *C08J 2333/14* (2013.01)

(58) Field of Classification Search
CPC .. C08F 220/14; C08F 220/28; C08F 290/062; C08F 2220/285; C08J 5/18; C08J 2333/00; C08J 2333/14; C08L 33/14
See application file for complete search history.

(56) References Cited

U.S. PATENT DOCUMENTS

2012/0225971 A1    9/2012  Konokawa et al.
2013/0203952 A1*   8/2013  Fujiyama ............ C08F 290/062
                                                  526/320

FOREIGN PATENT DOCUMENTS

| EP | 0 430 209 A2 | 6/1991 |
| JP | 02-153913 A | 6/1990 |
| JP | 2003-147033 A | 5/2003 |
| JP | 2012-250516 A | 12/2012 |
| WO | 2011/033998 A1 | 3/2011 |
| WO | 2012/029849 A1 | 3/2012 |

OTHER PUBLICATIONS

Extended European Search Report dated Jun. 21, 2016 by the European Patent Office in corresponding European Application No. 14838460.5.
Yildiz et al., "Photon transmission technique for studying swelling and drying kinetics of heterogeneous gels formed with various cross-linker contents", European Polymer Journal, 38:1591-1599 (2002).
International Search Report issued in corresponding International application No. PCT/JP2014/071746 dated Nov. 25, 2014.

* cited by examiner

*Primary Examiner* — Ling Choi
*Assistant Examiner* — Chun-Cheng Wang
(74) *Attorney, Agent, or Firm* — Morgan, Lewis & Bockius LLP

(57) ABSTRACT

This dispersion-type acrylic copolymer has a matrix (I) formed of an acrylic copolymer having a glass transition temperature of 50° C. or higher and a polymer unit (II) formed of an acrylic copolymer having a glass transition temperature of less than 50° C., the polymer unit (II) forms localized regions having an average diameter of 5-300 nm in the matrix (I), the matrix (I) and polymer unit (II) contain units of a crosslinking component, and the content of these units of a crosslinking component is more than 2% by mass relative to the total weight of the acrylic copolymer.

17 Claims, 2 Drawing Sheets

DISPERSION-TYPE ACRYLIC COPOLYMER

TECHNICAL FIELD

The present invention relates to a dispersion-type acrylic copolymer. The present invention also relates to an acrylic sheet formed of a dispersion-type acrylic copolymer.

The present invention claims priority from Japanese Patent Application No. 2013-170701, filed on Aug. 20, 2013 in Japan, and the content of which are incorporated herein by reference.

BACKGROUND ART

Due to excellent optical properties, the acrylic resin is applied in various fields such as lens, automotive parts, lighting parts, electronic displays, and surface boards of a pachinko machine or the like. However, the acrylic resin of a related art has disadvantages of poor flexibility and poor impact resistance.

As a method for obtaining a molded article of acrylic resin with high flexibility and transparency, for example, in Patent Document 1 and 2, a method of obtaining a molded article by cast polymerization of a polymerizable composition containing di(meth)acrylate with a soft segment part and mono(meth)acrylate as a main component is suggested.

According to Patent Document 1, when di(meth)acrylate having a soft segment part with high molecular weight is used, excellent flexibility is obtained according to addition of a small amount relative to mono(meth)acrylate relative. However, the transparency is impaired due to increased haze. Furthermore, although a molded article with excellent flexibility is obtained in Patent Document 2 by mixing two kinds of di(meth)acrylate and one kind of mono(meth) acrylate, the glass transition temperature (TgDMS) of the molded article is as low as 40° C., exhibiting a lack of heat resistance.

CITATION LIST

Patent Document

Patent Document 1: WO2011/033998
Patent Document 2: WO2012/029849

DISCLOSURE OF THE INVENTION

Problem to be Solved by the Invention

An object of the present invention is to provide, by solving the aforementioned problems, an acrylic sheet which has high transparency, elongation at break, and impact resistance and can provide good properties against bending.

Means for Solving Problem

The aforementioned subject is achieved by [1] to [16] described below.

[1]

A dispersion-type acrylic copolymer having a matrix (I) formed of an acrylic copolymer with a glass transition temperature of 50° C. or higher and a polymer unit (II) formed of an acrylic copolymer with a glass transition temperature of less than 50° C., in which the polymer unit (II) forms a localized region having an average diameter of 5 to 300 nm in the matrix (I), the matrix (I) and polymer unit (II) contain units of a crosslinking component, and the content of the units of a crosslinking component is more than 2% by mass relative to the total weight of the acrylic copolymer.

[2]

The dispersion-type acrylic copolymer described in [1], in which the localized region has an average diameter of 10 to 250 nm.

[3]

The dispersion-type acrylic copolymer described in [1] or [2], in which the localized region has an average area of 20 to 50000 $nm^2$.

[4]

The dispersion-type acrylic copolymer described in any one of [1] to [3], in which the localized region has an average area of 80 to 35000 $nm^2$.

[5]

The dispersion-type acrylic copolymer described in any one of [1] to [4], in which the acrylic copolymer for forming the matrix (I) has a glass transition temperature of 80° C. or higher.

[6]

The dispersion-type acrylic copolymer described in any one of [1] to [5], in which the crosslinking component is represented by the following general formula (1):

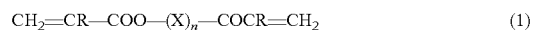

$$CH_2=CR-COO-(X)_n-COCR=CH_2 \quad (1)$$

((X) is at least one repeating unit selected from a group consisting of $C_2H_4O$, $C_3H_6O$, and $C_4H_8O$, molecular weight of $(X)_n$ is 500 or more, and R is H or $CH_3$).

[7]

The dispersion-type acrylic copolymer described in any one of [1] to [5], in which the crosslinking component is represented by the following general formula (2):

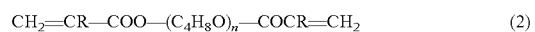

$$CH_2=CR-COO-(C_4H_8O)_n-COCR=CH_2 \quad (2)$$

(molecular weight of $(C_4H_8O)_n$ is 500 or more and R is H or $CH_3$).

[8]

A dispersion-type acrylic copolymer obtained by polymerizing a monomer mixture containing a (meth)acrylic acid ester monomer (A), a di(meth)acrylic acid ester monomer (B) represented by the following general formula (1) in which molecular weight of $(X)_n$ is 2500 or more, and a di(meth)acrylic acid ester monomer (C) represented by the following general formula (1) in which molecular weight of $(X)_n$ is 500 to 1800, in which mass composition of the monomer mixture is within a region surrounded by the point [60,6,34], the point [91,6,3], and the point [60,37,3] of a ternary phase diagram of [(A),(B),(C)]:

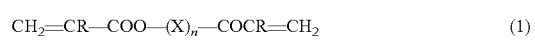

$$CH_2=CR-COO-(X)_n-COCR=CH_2 \quad (1)$$

((X) is at least one repeating unit selected from a group consisting of $C_2H_4O$, $C_3H_6O$, and $C_4H_8O$ and R is H or $CH_3$).

[9]

A dispersion-type acrylic copolymer obtained by polymerizing, at temperature condition of 30 to 90° C., a monomer mixture containing 60 to 97.5% by mass of a (meth)acrylic acid ester monomer (A), and 2.5 to 40% by mass of a di(meth)acrylic acid ester monomer (B) represented by the following general formula (1) in which molecular weight of $(X)_n$ is 2500 or more:

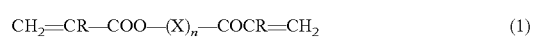

$$CH_2=CR-COO-(X)_n-COCR=CH_2 \quad (1)$$

((X) is at least one repeating unit selected from a group consisting of $C_2H_4O$, $C_3H_6O$, and $C_4H_8O$ and R is H or $CH_3$).

[10]

The dispersion-type acrylic copolymer described in [8] or [9], in which (X) is $C_4H_8O$.

[11]

An acrylic sheet formed of the dispersion-type acrylic copolymer described in any one of [1] to [10].

[12]

The acrylic sheet described in [11], in which the sheet has a thickness of 0.01 to 30 mm.

[13]

The acrylic sheet described in [12], in which the elongation at break is 10% or more at elongation rate of 5 mm/minute when the thickness is 3 mm.

[14]

The acrylic sheet described in [12] or [13], in which the haze is 25% or less when the thickness is 3 mm.

[15]

The acrylic sheet described in any one of [12] to [14], in which the total light transmittance is 80% or more when the thickness is 3 mm.

[16]

A dispersion-type acrylic copolymer obtained by polymerizing a monomer mixture containing a (meth)acrylic acid ester monomer (A), a di(meth)acrylic acid ester monomer (B) represented by the following general formula (2) with n≥35, and a di(meth)acrylic acid ester monomer (C) represented by the following general formula (2) with 7≤n≤25, in which mass composition of the monomer mixture is within a region surrounded by the point [60,6,34], the point [91,6,3], and the point [60,37,3] of a ternary phase diagram of [(A),(B),(C)]:

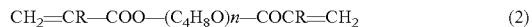

(2)

(with the proviso that R is H or $CH_3$).

EFFECT OF THE INVENTION

The acrylic sheet formed of the dispersion-type acrylic copolymer of the present invention has high transparency, excellent properties in terms of impact resistance and elongation at break, and excellent heat resistance.

Figure 1:
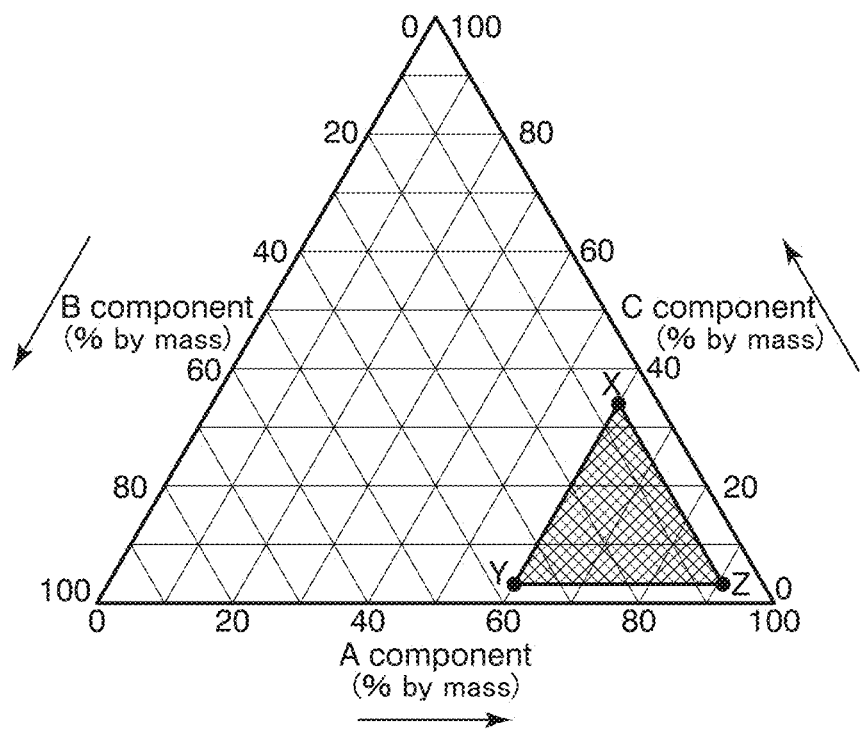
FIG. 1 is a ternary phase diagram of the present invention.

MODE(S) FOR CARRYING OUT THE INVENTION (Dispersion-type Acrylic Copolymer)

The dispersion-type acrylic copolymer of the present invention has a matrix (I) formed of an acrylic copolymer with a glass transition temperature of 50° C. or higher and a polymer unit (II) formed of an acrylic copolymer with a glass transition temperature of less than 50° C.

Hereinbelow, explanations are given for the matrix (I) and the polymer unit (II).

Matrix (I)

Main component of the matrix (I) is a unit of the (meth)acrylic acid ester monomer (A). The unit of (meth)acrylic acid ester monomer (A) is used for enhancing the transparency and elasticity of the dispersion-type acrylic copolymer of the present invention.

Ratio of the unit of the (meth)acrylic acid ester monomer (A) in the matrix (I) is 50 to 99% by mass, preferably 70 to 99% by mass, and more preferably 90 to 99% by mass.

(Meth)acrylic Acid Ester Monomer (A)

The (meth)acrylic acid ester monomer (A) indicates a monomer including methacrylic acid ester and acrylic acid ester.

Examples of the (meth)acrylic acid ester monomer (A) include acrylic acid, methyl acrylate, ethyl acrylate, propyl acrylate, butyl acrylate, isobutyl acrylate, t-butyl acrylate, pentyl acrylate, hexyl acrylate, cyclohexyl acrylate, 2-ethylhexyl acrylate, stearyl methacrylate, methacrylic acid, methyl methacrylate, ethyl methacrylate, propyl methacrylate, butyl methacrylate, isobutyl methacrylate, t-butyl methacrylate, pentyl methacrylate, hexyl methacrylate, cyclohexyl methacrylate, 2-ethylhexyl methacrylate, and stearyl methacrylate.

It may be used either singly or in combination of two or more types. Among the (meth)acrylic acid ester monomer (A), methyl methacrylate is preferred in terms of transparency of elasticity.

It is possible for the matrix (I) to contain a component unit other than the (meth)acrylic acid ester monomer (A). Examples of the other component unit of the matrix (I) include an allyl(meth)acrylate unit; a crosslinking aromatic vinyl monomer unit like divinylbenzene and trivinylbenzene; a polyol poly(meth)acrylate unit like glycerin triacrylate; a polyalkylene glycol di(meth)acrylate unit like poly (1,4-butylene glycol)dimethacrylate; and an alkylene glycol di(meth)acrylate unit like ethylene glycol diacrylate, ethylene glycol dimethacrylate, 1,3-butylene glycol diacrylate, 1,3-butylene glycol dimethacrylate, 1,4-butylene glycol diacrylate, and 1,4-butylene glycol dimethacrylate.

It may be used either singly or in combination of two or more types.

The glass transition temperature (TgDMS) of the acrylic copolymer for forming the matrix (I) is 50° C. or higher. The glass transition temperature (TgDMS) of the acrylic copolymer for forming the matrix (I) is measured by the method described below.

Method for Measuring Glass Transition Temperature (TgDMS)

A test piece having a thickness of 3 mm, a width of 10 mm, and a length of 60 mm is obtained from the acrylic copolymer for forming the matrix (I). The dynamic viscoelasticity of the test piece is determined by using a dynamic viscoelasticity tester (trade name: EXSTAR DMS6100, manufactured by SII Nano Technology (Inc.)), in a nitrogen atmosphere and under measurement conditions of a frequency of 1 Hz, a temperature range of −100° C. to 180° C., and a heating rate of 2° C./min. A temperature at which a temperature/tan δ curve obtained from the results exhibits the maximum value corresponds to TgDMS.

As the acrylic copolymer for forming the matrix (I) has the glass transition temperature (TgDMS) of 50° C. or higher, the dispersion-type acrylic copolymer can have improved impact resistance and elasticity. The glass transition temperature (TgDMS) is preferably 65° C. or higher, and more preferably 80° C. or higher.

Polymer Unit (II)

The polymer unit (II) forms a particle-like localized region in the matrix (I). As the localized region is dispersed in the matrix (I), a dispersion-type acrylic copolymer is formed.

Main component of the polymer unit (II) is one or both of the unit of the di(meth)acrylic acid ester monomer (B) and the unit of the di(meth)acrylic acid ester monomer (C) that are represented by the following general formula (1).

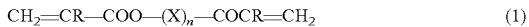

$$CH_2=CR-COO-(X)_n-COCR=CH_2 \quad (1)$$

((X) is at least one repeating unit selected from a group consisting of $C_2H_4O$, $C_3H_6O$, and $C_4H_8O$, molecular weight of $(X)_n$ is 500 or more, and R is H or $CH_3$).

In the polymer unit (II), ratio of the total of the unit of the (meth)acrylic acid ester monomer (B) and the unit of the (meth)acrylic acid ester monomer (C) is 50 to 99% by mass, preferably 70 to 99% by mass, and more preferably 90 to 99% by mass.

Di(meth)acrylic Acid Ester Monomer (B)

The di(meth)acrylic acid ester monomer (B) is represented by the above general formula (1) and the molecular weight of $(X)_n$ is 2500 or more.

The di(meth)acrylic acid ester monomer (B) is used for giving flexibility to a dispersion-type acrylic copolymer by forming, in a dispersion-type acrylic copolymer obtained by polymerization of a monomer mixture, a crosslinking structure based on a long-chain molecular structure with high flexibility.

The molecular weight of $(X)_n$ of the di(meth)acrylic acid ester monomer (B) is 2500 or more, preferably 2800 to 10000, and more preferably 3000 to 5000. When the molecular weight of $(X)_n$ is 2500 or more, significantly improved impact resistance and flexibility are obtained. Furthermore, when the molecular weight of $(X)_n$ is 10000 or less, the compatibility of the monomer mixture is improved.

(X) in the di(meth)acrylic acid ester monomer (B) is preferably $C_4H_8O$ from the viewpoint of low water absorption property and transparency of the dispersion-type acrylic copolymer. Namely, the di(meth)acrylic acid ester monomer (B) used in the present invention is preferably represented by the following general formula (2).

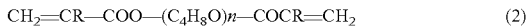

$$CH_2=CR-COO-(C_4H_8O)n-COCR=CH_2 \quad (2)$$

(with the proviso that R is H or $CH_3$).

The number of repeating unit ($C_4H_8O$) in the di(meth) acrylic acid ester monomer (B), that is, n, is preferably as follows: $n \geq 35$ and $40 \leq n \leq 140$. As the number of repeating unit n satisfies $n \geq 35$, more significantly improved flexibility can be obtained even with addition of a small amount. Furthermore, as the number of repeating unit n satisfies $n \geq 40$, a dispersion-type acrylic copolymer with more excellent flexibility can be obtained. Furthermore, from the viewpoint of the compatibility of a polymerizable composition before polymerization, it preferably satisfies $n \leq 140$.

Di(meth)acrylic Acid Ester Monomer (C)

The di(meth)acrylic acid ester monomer (C) is represented by the above general formula (1) and the molecular weight of $(X)_n$ is 500 to 1800.

The di(meth)acrylic acid ester monomer (C) is used for improving the compatibility between the (meth)acrylic acid ester monomer (A) and the di(meth)acrylic acid ester monomer (B) and increasing the transparency of the copolymer.

The molecular weight of $(X)_n$ of the di(meth)acrylic acid ester monomer (C) is 500 to 1800, preferably 600 to 1700, and more preferably 1000 to 1500. When the molecular weight of $(X)_n$ is 500 to 1800, a dispersion-type acrylic copolymer with excellent flexibility, impact resistance, and transparency can be obtained.

(X) in the di(meth)acrylic acid ester monomer (C) is preferably $C_4H_8O$ from the viewpoint of low water absorption property and transparency of the dispersion-type acrylic copolymer. Namely, the di(meth)acrylic acid ester monomer (C) used in the present invention is preferably represented by the above general formula (2).

The number of repeating unit ($C_4H_8O$) in the di(meth) acrylic acid ester monomer (C), that is, n, is preferably as follows: $9 \leq n \leq 25$, and preferably $15 \leq n \leq 20$. As the number of repeating unit n satisfies $9 \leq n \leq 25$, a dispersion-type acrylic copolymer with excellent flexibility and transparency can be obtained. Furthermore, as number of repeating unit n satisfies $15 \leq n \leq 20$, a dispersion-type acrylic copolymer with more excellent flexibility and transparency can be obtained.

The polymer unit (II) may contain a component unit other than the unit of the di(meth)acrylic acid ester monomer (B) and the unit of the di(meth)acrylic acid ester monomer (C).

Examples of the other component unit of the polymer unit (II) include acrylic acid, methyl acrylate, ethyl acrylate, propyl acrylate, butyl acrylate, isobutyl acrylate, t-butyl acrylate, pentyl acrylate, hexyl acrylate, cyclohexyl acrylate, 2-ethylhexyl acrylate, stearyl methacrylate, methacrylic acid, methyl methacrylate, ethyl methacrylate, propyl methacrylate, butyl methacrylate, isobutyl methacrylate, t-butyl methacrylate, pentyl methacrylate, hexyl methacrylate, cyclohexyl methacrylate, 2-ethylhexyl methacrylate, and stearyl methacrylate.

Additional examples include an allyl(meth)acrylate unit; a crosslinking aromatic vinyl monomer unit like divinylbenzene and trivinylbenzene; a polyol poly(meth)acrylate unit like glycerin triacrylate; and an alkylene glycol di(meth) acrylate unit like ethylene glycol diacrylate, ethylene glycol dimethacrylate, 1,3-butylene glycol diacrylate, 1,3-butylene glycol dimethacrylate, 1,4-butylene glycol diacrylate, and 1,4-butylene glycol dimethacrylate.

It may be used either singly or in combination of two or more types.

The glass transition temperature (TgDMS) of the acrylic copolymer for forming polymer unit (II) is lower than 50° C. Accordingly, the polymer unit (II) has flexibility and the dispersion-type acrylic copolymer can have improved impact resistance. The glass transition temperature (TgDMS) is preferably 40° C. or lower.

The average diameter of the polymer unit (II) is 300 nm or less, and preferably 250 nm or less from the viewpoint of having improved transparency of the dispersion-type acrylic copolymer. Furthermore, from the viewpoint of having improved impact resistance of the dispersion-type acrylic copolymer, it is 5 nm or more and preferably 10 nm or more.

The average diameter of the polymer unit (II) can be measured by the following method, for example.

A test specimen of a dispersion-type acrylic copolymer, which has been obtained by cast polymerization, is subjected to leveling and an extremely thin film specimen with a thickness of about 80 nm is cut out by using a microtome equipped with a diamond knife. The specimen is dyed by exposure to vapor of 0.5% aqueous solution of ruthenium tetroxide. Then, an observation is made by using a transmission type electron microscope (TEM) with magnification ratio of 5000 to 20000.

For measuring the average diameter of the polymer unit (II), the maximum diameter of each polymer unit (II) is obtained by using "Image-Pro Plus", which is an image analysis software manufactured by NIPPON ROPER K.K. In the present invention, measurements are performed for 100 or more particles, and the average value obtained therefrom is used as an average diameter.

The average area of the polymer unit (II) is 50000 nm$^2$ or less, and preferably 35000 nm$^2$ or less from the viewpoint of having improved transparency of the dispersion-type acrylic copolymer. Furthermore, from the viewpoint of having improved impact resistance of the dispersion-type acrylic copolymer, it is 20 nm$^2$ or more, and preferably 80 nm$^2$ or more.

The average area of the polymer unit (II) can be measured by the following method, for example.

Similar to the method for measuring the average diameter of the polymer unit (II) described above, an extremely thin film specimen of the dispersion-type acrylic copolymer is observed under a transmission type electron microscope (TEM). In addition, the area of each polymer unit (II) is obtained by using "Image-Pro Plus", which is an image analysis software manufactured by NIPPON ROPER K.K. In the present invention, measurements are performed for 100 or more particles, and the average value obtained therefrom is used as an average area.

In the dispersion-type acrylic copolymer of the present invention, a unit of the crosslinking component is contained. Examples of the crosslinking component include the aforementioned ally(meth)acrylate; a crosslinking aromatic vinyl monomer like divinyl benzene and trivinyl benzene; polyol poly(meth)acrylate unit like glycerin triacrylate; polyalkylene glycol di(meth)acrylate like poly(1,4-butylene glycol) dimethacrylate; and alkylene glycol di(meth)acrylate like ethylene glycol diacrylate, ethylene glycol dimethacrylate, 1,3-butylene glycol diacrylate, 1,3-butylene glycol dimethacrylate, 1,4-butylene glycol diacrylate, and 1,4-butylene glycol dimethacrylate.

Content of the crosslinking component is, from the viewpoint of having improved impact resistance and transparency of the dispersion-type acrylic copolymer, more than 2% by mass, preferably 2.5 to 90% by mass, and more preferably 5 to 60% by mass relative to the total amount of the acrylic copolymer.

As for the method for producing the dispersion-type acrylic copolymer of the present invention, there are [Method 1] and [Method 2] described below.

[Method 1]

A method for polymerizing a monomer mixture (D-1) containing the (meth)acrylic acid ester monomer (A), the di(meth)acrylic acid ester monomer (B) represented by the above general formula (1) in which molecular weight of $(X)_n$ is 2500 or more, and the di(meth)acrylic acid ester monomer (C) represented by the above general formula (1) in which molecular weight of $(X)_n$ is 500 to 1800, in which mass composition of the monomer mixture (D-1) is within a region surrounded by the point [60,6,34], the point [91,6, 3], and the point [60,37,3] of a ternary phase diagram of [(A),(B),(C)].

[Method 2]

A method for polymerizing, at temperature condition of 30 to 90° C., the monomer mixture (D-2) containing 60 to 97.5% by mass of the (meth)acrylic acid ester monomer (A) and 2.5 to 40% by mass of the di(meth)acrylic acid ester monomer (B) represented by the above general formula (1) in which molecular weight of $(X)_n$ is 2500 or more.

Monomer Mixture (D-1)

The monomer mixture (D-1) used in [Method 1] contains the monomer (A), the monomer (B), and the monomer (C).

The mass composition of the monomer mixture (D-1) has a composition which is within a region surrounded by the point [60,6,34], the point [91,6,3], and the point [60,37,3], and preferably a composition which is within a region surrounded by the point [70,10,20], the point [85,10,5], the point [70,25,5] of a ternary phase diagram of [the (meth) acrylic acid ester monomer (A), the di(meth)acrylic acid ester monomer (B), the di(meth)acrylic acid ester monomer (C)].

According to the present invention, if necessary, the monomer mixture (D-1) may contain a vinyl monomer other than the monomer (A), the monomer (B), and the monomer (C) within a range in which the flexibility and transparency are not impaired.

Examples of the other vinyl monomer include a monofunctional vinyl monomer other than the monomer (A) and a polyfunctional vinyl monomer other than the monomer (B) and the monomer (C). Examples of the monofunctional vinyl monomer other than the monomer (A) include an aromatic vinyl monomer such as styrene or α-methylstyrene and a vinyl cyanide monomer such as acrylonitrile or methacrylonitrile. The other vinyl monomer may be used either singly or in combination of two or more types.

The monomer mixture (D-1) can be polymerized like (1) and (2) described below.

(1): A mold and a gasket are prepared according to the use, and by injecting the monomer mixture (D-1) containing a photopolymerization initiator and irradiating a single side or both sides of the mold with active energy ray, polymerization is allowed to progress.

(2): On a continuous sheet-like product, a continuous coating film of the monomer mixture (D-1) added with a photopolymerization initiator is formed, and by continuous irradiation of active energy ray, polymerization is allowed to progress.

Examples of the photopolymerization initiator include 1-hydroxy-cyclohexyl phenyl ketone, 2-hydroxy-2-methyl-1-phenyl-propane-1-one, methyl phenylglyoxylate, acetophenone, benzophenone, diethoxyacetophenone, 2,2-dimethoxy-2-phenylacetophenone, 1-phenyl-1,2-propane-dione-2-(o-ethoxycarbonyl)oxime, 2-methyl[4-(methylthio) phenyl]-2-morpholinyl-1-propanone, benzil, benzoin methyl ether, benzoin ethyl ether, benzoin isopropyl ether, benzoin isobutyl ether, 2-cholothioxanthone, isopropyl thioxanthone, 2,4,6-trimethylbenzoyldiphenylphosphine oxide, benzoyldiphenylphosphine oxide, 2-methylbenzoyldiphenylphosphine oxide and benzoyldimethoxyphosphine oxide. It may be used either singly or in combination of two or more types.

Monomer Mixture (D-2)

The monomer mixture (D-2) used in [Method 2] contains the monomer (A) and the monomer (B).

With regard to the mass composition ratio of the monomer mixture (D-2), the monomer (A) is 60 to 97.5% by mass and the monomer (B) is 2.5 to 40% by mass. Furthermore, it is preferable that the monomer (A) is 65 to 95% by mass and the monomer (B) is 5 to 35% by mass.

If necessary, the monomer mixture (D-2) may contain a vinyl monomer other than the monomer (A) and the monomer (B) within a range in which the flexibility and transparency are not impaired.

Examples of the other vinyl monomer include a monofunctional vinyl monomer other than the monomer (A) and a polyfunctional vinyl monomer other than the monomer (B). Examples of the monofunctional vinyl monomer other than the monomer (A) include an aromatic vinyl monomer such as styrene or α-methylstyrene and a vinyl cyanide monomer such as acrylonitrile or methacrylonitrile.

The other vinyl monomer may be used either singly or in combination of two or more types.

The monomer mixture (D-2) can be polymerized like (1) to (4) described below.

(1): A mold and a gasket are prepared according to the use, and by injecting the monomer mixture (D-2) containing a thermal polymerization initiator and irradiating a single side or both sides of the mold to 30 to 90° C., polymerization is allowed to progress.

(2): A mold and a gasket are prepared according to the use, and by injecting the monomer mixture (D-2) containing a photopolymerization initiator and irradiating a single side or both sides of the mold with active energy ray at temperature condition of 30 to 90° C., polymerization is allowed to progress.

(3): On a continuous sheet-like product, a continuous coating film of the monomer mixture (D-2) added with a thermal polymerization initiator is formed, and by continuous heating to 30 to 90° C., polymerization is allowed to progress.

(4): On a continuous sheet-like product, a continuous coating film of the monomer mixture (D-2) added with a photopolymerization initiator is formed, and by continuous irradiation of active energy ray at temperature condition of 30 to 90° C., polymerization is allowed to progress.

The photopolymerization initiator used in the monomer mixture (D-2) is the same as the photopolymerization initiator used in the monomer mixture (D-1).

Examples of a thermal polymerization initiator include an organic peroxide polymerization initiator such as benzoyl peroxide, lauroyl peroxide, tert-butyl peroxyisobutyrate, tert-butyl peroxy-2-ethylhexanoate, tert-butyl peroxyneodecanoate, tert-hexyl peroxypivalate, diisopropyl peroxydicarbonate, or bis(4-tert-butylcyclohexyl) peroxydicarbonate. Further examples thereof include an azo-based polymerization initiator such as 2,2'-azobisisobutyronitrile, 2,2'-azobis(2,4-dimethylvaleronitrile), or 2,2'-azobis(4-methoxy-2,4-dimethylvaleronitrile).

It may be used either singly or in combination of two or more types.

To the polymerizable composition consisting of a monomer mixture and a polymerization initiator, a release agent may be added, if necessary. From the viewpoint of having a good releasing property, the addition amount of the release agent is preferably 0.001 part by mass or more and more preferably 0.005 part by mass or more relative to 100 parts by mass of the monomer mixture.

Examples of the release agent include sodium dioctyl sulfosuccinate (trade name: AEROSOL OT-100) manufactured by Nihon Cytec Industries Inc. and a mixture of diethyl phosphoric acid ester and monoethyl phosphoric acid at a ratio of 55:45 manufactured by JOHOKU CHEMICAL Co., Ltd. (trade name: JP-502).

In the polymerizable composition of the present invention, various additives such as a lubricant, a plasticizer, an antibacterial agent, an anti-mold agent, a light stabilizer, an ultraviolet ray absorbing agent, a blueing agent, a dye, an antistatic agent, or a heat stabilizer may be added.

Acrylic Sheet

The acrylic sheet of the present invention is formed of the dispersion-type acrylic copolymer of the present invention.

When an acrylic sheet with thickness of 3 mm % is subjected to an elongation test at elongation rate of 5 mm/minute and room temperature of 23° C., the elongation at break of acrylic sheet of the present invention is 10% or more, and preferably 20% or more.

When the elongation at break of the acrylic sheet is 10% or more, the flexibility and impact resistance of the acrylic sheet can be improved.

The haze of the acrylic sheet of the present invention is 25% or less, preferably 7% or less, and more preferably 3% or less when the thickness is 3 mm.

When the haze of the acrylic sheet is 25% or less, the transparency of the acrylic sheet can be improved.

The total light transmittance of the acrylic sheet of the present invention is 80% or more, preferably 84% or more, and more preferably 90% or more when the thickness is 3 mm.

When total light transmittance of the acrylic sheet of the present invention is 80% or more, the transparency of the acrylic sheet can be improved.

The molded article formed with the dispersion-type acrylic copolymer of the present invention is useful as a dense optical member of a flexible display, a solar battery, an organic EL, a lighting cover, a liquid crystal display, and a light guide sheet.

EXAMPLES

Hereinbelow, the present invention is explained in view of the examples.

Evaluation of the acrylic sheets (thickness: 0.5 mm) of Examples 1 to 3 and Comparative Examples 1 to 4 was performed according to the method described below.

(1) Total Light Transmittance

On the basis of JIS K7361-1, the total light transmittance of an acrylic sheet cut to have a size of 5 cm×5 cm was measured by using a haze meter (trade name: NDH2000, manufactured by NIPPON DENSHOKU INDUSTRIES Co., LTD.).

(2) Haze

On the basis of JIS K7105, the haze value of an acrylic sheet cut to have a size of 5 cm×5 cm was measured by using a haze meter (trade name: NDH2000, manufactured by NIPPON DENSHOKU INDUSTRIES Co., LTD.).

(3) Glass Transition Temperature (Tg)

An acrylic sheet cut to have a width of 5 mm and length of 50 mm was determined by using a dynamic viscoelasticity tester (trade name: EXSTAR DMS6100, manufactured by SII Nano Technology (Inc.)) under measurement conditions of a frequency of 1 Hz, a temperature range of −100° C. to 180° C., and a heating rate of 2° C./min. A temperature at which a temperature/tan δ curve obtained from the results exhibits the maximum value was used as the glass transition temperature (Tg).

(4) Elasticity at Break

According to JIS K6251, 5 pieces of the acrylic sheet of dumbbell-shape No. 1 type were prepared by using a super dumbbell cutter (trade name: SDK-100D, manufactured by DUMBBELL CO., LTD.). Then, an elongation test was performed 5 times with the obtained test specimen by using an elongation tester (trade name: Tensilon, manufactured by ORIENTEC Co., LTD.) at room temperature of 23° C. and elongation rate of 500 mm/minute. Then, the mean value of the tangent line of stress strain curve was obtained as elasticity.

(5) Elongation at Break

According to JIS K6251, 5 pieces of the acrylic sheet of dumbbell-shape No. 1 type were prepared by using a super dumbbell cutter (trade name: SDK-100D, manufactured by DUMBBELL CO., LTD.). Then, an elongation test was performed 5 times with the obtained test specimen by using an elongation tester (trade name: Tensilon, manufactured by ORIENTEC Co., LTD.) at room temperature of 23° C. and elongation rate of 500 mm/minute. Accordingly, the elongation at break was obtained as a mean value.

(6) Average Diameter and Average Area of Polymer Unit (II)

The average diameter and average area of the polymer unit (II) of a dispersion-type acrylic copolymer were measured by the method described below.

A test specimen of a dispersion-type acrylic copolymer, which has been obtained by cast polymerization, was subjected to leveling and an extremely thin film specimen with a thickness of about 80 nm is cut out by using a microtome equipped with a diamond knife. The specimen was dyed by exposure to vapor of 0.5% aqueous solution of ruthenium tetroxide. Then, an observation was made by using a transmission type electron microscope (TEM) with magnification ratio of 5000 to 20000.

For measuring the average diameter of the polymer unit (II), the maximum diameter and area of each polymer unit (II) were obtained by using "Image-Pro Plus", which is an image analysis software manufactured by NIPPON ROPER K.K. Herein, the measurements were performed for 100 or more particles, and the average value obtained therefrom was used as an average diameter and an average area.

Example 1

Preparation of Polymerizable Composition

80 Parts by mass of the methyl methacrylate (A-1) as the (meth)acrylic acid ester monomer (A), 15 parts by mass of the polybutylene glycol dimethacrylate (B-1), which is represented by the general formula (1) and has butylene oxide group repeat number (n) of 40, as the di(meth)acrylic acid ester monomer (B), and 5 parts by mass of the polybutylene glycol dimethacrylate (C-1), which is represented by the general formula (1) and has butylene oxide group repeat number (n) of 20, as the di(meth)acrylic acid ester monomer (C) were admixed with one another to obtain a monomer mixture. To 100 parts by mass of the monomer mixture, 0.3 part by mass of 1-hydroxy-cyclohexylphenyl-ketone (trade name: IRGACURE 184, manufactured by BASF JAPAN LTD.) was added as a polymerization initiator to obtain a polymerizable composition. Furthermore, as a release agent, 0.05 part by mass of sodium dioctyl sulfosuccinate (trade name: AEROSOL OT-100, manufactured by Nihon Cytec Industries Inc.) was added thereto followed by mixing. After that, a deaeration treatment was performed under reduced pressure.

A pair of glass plates with a size of 300 mm×300 mm was disposed to face each other at interval of 0.5 mm via a gasket made of polyvinyl chloride to form a mold. To inside the mold formed therefrom, a polymerizable composition added with the aforementioned release agent was injected. By using a chemical lamp, the mold was then irradiated with light for 120 minutes at peak luminance of 2.1 mJ/cm$^2$ for carrying out the photopolymerization of the polymerizable composition which has been added with a release agent. Subsequently, it was heated for 30 minutes in a furnace with air at 130° C. to complete the polymerization. After that, the mold was cooled to room temperature, and the frame was removed to obtain an acrylic sheet with average thickness of about 500 μm. The evaluation results are shown in Table 2.

Examples 2 and 3

The methyl methacrylate (A-1) as the (meth)acrylic acid ester monomer (A), the polybutylene glycol dimethacrylate (B-1), which is represented by the general formula (1) and has butylene oxide group repeat number (n) of 40, as the di(meth)acrylic acid ester monomer (B), and the polybutylene glycol dimethacrylate (C-1), which is represented by the general formula (1) and has butylene oxide group repeat number (n) of 20, as the di(meth)acrylic acid ester monomer (C) were admixed with one another to obtain a monomer mixture. The acrylic sheet was obtained in the same manner as Example 1 except that the use amount of each component was changed to the use amount described in Table 1. The evaluation results are shown in Table 2.

Comparative Example 1

The methyl methacrylate (A-1) as the (meth)acrylic acid ester monomer (A) and the polybutylene glycol dimethacrylate (B-1), which is represented by the general formula (1) in which molecular weight of (X)n is 2880, as the di(meth)acrylic acid ester monomer (B) were admixed with each other to obtain a monomer mixture. The acrylic sheet was obtained in the same manner as Example 1 except that the monomer mixture was prepared with the use amount described in Table 1. The evaluation results are shown in Table 2.

Comparative Example 2

Figure 2:
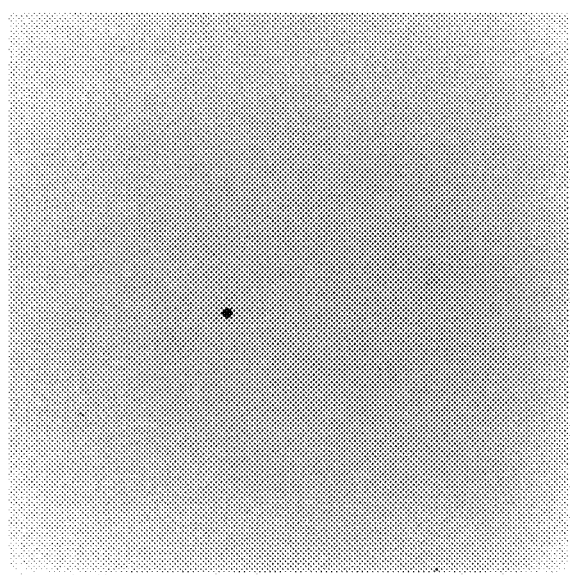
FIG. 2 is a transmission type electron microscopic image of the acrylic sheet of Comparative Example 2.

The methyl methacrylate (A-1) as the (meth)acrylic acid ester monomer (A) and the polybutylene glycol dimethacrylate (C-1), which is represented by the general formula (1) in which molecular weight of (X)n is 1400, as the di(meth)acrylic acid ester monomer (C) were admixed with each other to obtain a monomer mixture. The acrylic sheet was obtained in the same manner as Example 1 except that the monomer mixture was prepared with the use amount described in Table 1. The evaluation results are shown in Table 2. Furthermore, a transmission type electron microscopic image of the acrylic sheet of Comparative Example 2 is shown in FIG. 2.

Comparative Example 3

Figure 3:
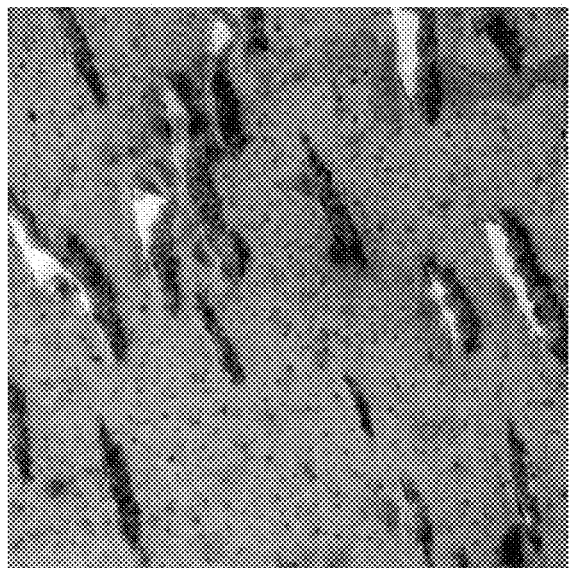
FIG. 3 is a transmission type electron microscopic image of the acrylic sheet of Comparative Example 3.

85 Parts by mass of the methyl methacrylate (A-1) as the (meth)acrylic acid ester monomer (A) and 15 parts by mass of the polybutylene glycol dimethacrylate (B-1), which is represented by the general formula (1) in which molecular weight of (X)n is 2880, as the di(meth)acrylic acid ester monomer (B) were admixed with each other to obtain a monomer mixture. The acrylic sheet was obtained in the same manner as Example 1 except that the monomer mixture was prepared with the use amount described in Table 1. The evaluation results are shown in Table 2. Furthermore, a transmission type electron microscopic image of the acrylic sheet of Comparative Example 3 is shown in FIG. 3.

Comparative Example 4

The methyl methacrylate (A-1) as the (meth)acrylic acid ester monomer (A) and the polybutylene glycol dimethacrylate (C-1), which is represented by the general formula (1) in which molecular weight of (X)n is 650, as the di(meth)acrylic acid ester monomer (C) were admixed with each other to obtain a monomer mixture. The acrylic sheet was obtained in the same manner as Example 1 except that the monomer mixture was prepared with the use amount described in Table 1. The evaluation results are shown in Table 2.

TABLE 1

|  |  | Example 1 | Example 2 | Example 3 | Comparative Example 1 | Comparative Example 2 | Comparative Example 3 | Comparative Example 4 |
|---|---|---|---|---|---|---|---|---|
| Monomer (A) parts by mass | A-1 | 80 | 80 | 80 | 85 | 80 | 80 | 80 |
| Monomer (B) parts by mass | B-1 | 15 | 12 | 10 | 15 | — | 20 | — |
| Monomer (C) parts by mass | C-1 | 5 | 8 | 10 | — | 20 | — | — |
|  | C-2 | — | — | — | — | — | — | 20 |
|  | C-3 | — | — | — | — | — | — | — |
| Initiator | Irgacure 184 [parts by mass] | 0.3 | 0.3 | 0.3 | 0.3 | 0.3 | 0.3 | 0.3 |
|  | Perhexyl PV [parts by mass] | — | — | — | — | — | — | — |
|  | V-70 [parts by mass] | — | — | — | — | — | — | — |
| Release agent | Aerosol OT-100 [parts by mass] | 0.05 | 0.05 | 0.05 | 0.05 | 0.05 | 0.05 | 0.05 |
| Conditions for polymerization | Method for polymerization | Light | Light | Light | Light | Light | Light | Light |
|  | Illuminance [mW/cm$^2$] | 2.1 | 2.1 | 2.1 | 2.1 | 2.1 | 2.1 | 2.1 |
|  | Polymerization temperature [° C.] | 25.0 | 25.0 | 25.0 | 25.0 | 25.0 | 25.0 | 25.0 |
|  | Polymerization time [h] | 2.0 | 2.0 | 2.0 | 2.0 | 2.0 | 2.0 | 2.0 |
| Conditions for polymerization | Polymerization temperature [° C.] | 130 | 130 | 130 | 130 | 130 | 130 | 130 |
|  | Polymerization time [h] | 0.5 | 0.5 | 0.5 | 0.5 | 0.5 | 0.5 | 0.5 |

TABLE 2

|  |  | Example 1 | Example 2 | Example 3 | Comparative Example 1 | Comparative Example 2 | Comparative Example 3 | Comparative Example 4 |
|---|---|---|---|---|---|---|---|---|
| Optical properties | Total light transmittance [%] | 90.8 | 92.4 | 92.4 | 92.4 | 92.5 | 92.4 | 92.5 |
|  | Haze [%] | 2.8 | 0.3 | 0.3 | 22.3 | 0.2 | 14.2 | 0.2 |
| Mechanical properties | Bending elasticity [GPa] | — | — | — | — | — | — | — |
|  | Elasticity at break [GPa] | 1.7 | 1.6 | 1.9 | 2.0 | 2.1 | 1.6 | 2.3 |
|  | Elongation at break [%] | 33.3 | 34.0 | 21.5 | 15.1 | 9.8 | 37.4 | 4.0 |
|  | Rockwell hardness | — | — | — | — | — | — | — |
|  | Charpy impact value [kJ/m$^2$] | — | — | — | — | — | — | — |
|  | DuPont impact value [J] | — | — | — | — | — | — | — |
|  | Presence or absence of whitening | — | — | — | — | — | — | — |
| Thermal properties | Glass transition temperature [° C.] | 108 | 103 | 106 | 117 | 101 | 110 | 104 |
| Average area [nm$^2$] |  | 10127 | 4499 | 5933 | 571577 | 0 | 103939 | 0 |
| Average diameter [nm] |  | 146 | 100 | 97 | 927 | 0 | 407 | 0 |

The acrylic sheet of Examples 1 to 3 exhibited high transparency, excellent performance in terms of elongation at break or bending, and excellent heat resistance.

On the other hand, the acrylic sheet of Comparative Examples 1 and 3 exhibited poor compatibility, and thus yielding poor performance in terms of transparency of a copolymer, because it does not contain the di(meth)acrylic acid ester monomer (C) represented by the general formula (1) in which (X) is 500 to 1800, even if it contains methyl methacrylate and the polybutylene glycol dimethacrylate (B-1) which is represented by the general formula (1) in which molecular weight of (X)n is 2880.

The acrylic sheet of Comparative Example 2 exhibited low elongation at break, and thus yielding poor flexibility, because it does not contain the di(meth)acrylic acid ester monomer (B) which is represented by the general formula (1) in which (X) is 2500 or more, even if it contains the di(meth)acrylic acid ester monomer (C-1) represented by the general formula (1) in which the molecular weight of (X)n is 1400.

The acrylic sheet of Comparative Example 4 exhibited low elongation at break, and thus yielding poor flexibility, because it does not contain the di(meth)acrylic acid ester monomer (B) which is represented by the general formula (1) in which (X) is 2500 or more, even if it contains the polybutylene glycol dimethacrylate (C-2) represented by the general formula (1) in which molecular weight of (X)n is 650.

Evaluation of the acrylic sheets of Examples 4 to 10 (thickness: 3 mm) was performed according to the method described below.

(1) Total Light Transmittance

On the basis of JIS K7361-1, the total light transmittance of an acrylic sheet cut to have a size of 5 cm×5 cm was measured by using a haze meter (trade name: NDH2000, manufactured byNIPPON DENSHOKU INDUSTRIES Co., LTD.).

(2) Haze

On the basis of JIS K7105, the haze value of an acrylic sheet cut to have a size of 5 cm×5 cm was measured by using a haze meter (trade name: NDH2000, manufactured by NIPPON DENSHOKU INDUSTRIES Co., LTD.).

(3) Glass Transition Temperature (Tg)

An acrylic sheet cut to have a width of 1 cm and length of 6 cm was determined by using a dynamic viscoelasticity tester (trade name: EXSTAR DMS6100, manufactured by SII Nano Technology (Inc.)) under measurement conditions of a frequency of 1 Hz, a temperature range of −100° C. to 180° C., and a heating rate of 2° C./min. A temperature at which a temperature/tan δ curve obtained from the results exhibits the maximum value was used as the glass transition temperature (Tg).

(4) Elasticity at Break

5 Pieces of the acrylic sheet cut to have a width of 1 cm and a length of 20 cm were prepared. Then, an elongation test was performed 5 times with the obtained test specimen by using an elongation tester (trade name: Tensilon, manufactured by ORIENTEC Co., LTD.) at chuck-to-chuck distance of 20 cm, room temperature of 23° C. and elongation rate of 5 mm/minute. Then, the mean value of the tangent line of stress strain curve was obtained as elasticity.

(5) Elongation at Break

5 Pieces of the acrylic sheet cut to have a width of 1 cm and a length of 20 cm were prepared. Then, an elongation test was performed 5 times with the obtained test specimen by using an elongation tester (trade name: Tensilon, manufactured by ORIENTEC Co., LTD.) at chuck-to-chuck distance of 20 cm, room temperature of 23° C. and elongation rate of 5 mm/minute. Then, the mean value of elongation at break was obtained.

(6) Bending Elasticity

Bending elasticity of the obtained acrylic sheet was measured based on JIS-K7111. For the measurement, a test specimen was cut to have a length of 8 cm×a width of 1 cm×thickness of 3 mm and the measurement was performed 5 times at room temperature of 23° C. Then, the mean value of bending elasticity was obtained.

(7) Rockwell Hardness

At room temperature of 23° C., the obtained the acrylic sheet was subjected to measurement of Rockwell hardness at 5 positions with R scale. Then, the mean value of Rockwell hardness was obtained.

(8) Charpy Impact Strength

The obtained the acrylic sheet was subjected to measurement of Charpy impact strength on the basis ofJIS-K7111. For the measurement, a test specimen was cut to have a length of 8 cm×a width of 1 cm×thickness of 3 mm and the measurement was performed in flatwise manner at conditions including no notch.

(9) Falling Weight Test

The obtained acrylic sheet was evaluated in terms of impact resistance by using a DuPont impact tester. As a sample, a resin plate cut to have a square shape (50 mm×50 mm) was used. By using a weight of 500 g with punch diameter of 7.9 mm and pestle diameter of 15.2 mm, the 50% break energy was evaluated according to the standard described in JIS-K7211. Furthermore, the state of sample which is not broken under application of impact of a weight in DuPont impact test was visually examined. Then, a sample with whitening was evaluated as × and a sample without whitening was evaluated as ○. The evaluation results are shown in the column of stress whitening.

(10) Average Diameter and Average Area of Polymer Unit (II)

The average diameter and average area of the polymer unit (II) of a dispersion-type acrylic copolymer were measured by the method described below.

A test specimen of a dispersion-type acrylic copolymer, which has been obtained by cast polymerization, was subjected to leveling and an extremely thin film specimen with a thickness of about 80 nm is cut out by using a microtome equipped with a diamond knife. The specimen was dyed by exposure to vapor of 0.5% aqueous solution of ruthenium tetroxide. Then, an observation was made by using a transmission type electron microscope (TEM) with magnification ratio of 5000 to 20000.

For measuring the average diameter of the polymer unit (II), the maximum diameter and area of each polymer unit (II) were obtained by using "Image-Pro Plus", which is an image analysis software manufactured by NIPPON ROPER K.K. Herein, the measurements were performed for 100 or more particles, and the average value obtained therefrom was used as an average diameter and average area.

Example 4

Preparation of Polymerizable Composition

80 Parts by mass of the methyl methacrylate (A-1) as the (meth)acrylic acid ester monomer (A) and 20 parts by mass of the polybutylene glycol dimethacrylate (B-1), which is represented by the general formula (1) in which the butylene oxide group repeat number (n) is 40, as the di(meth)acrylic acid ester monomer (B) were admixed with each other to obtain a monomer mixture. To 100 parts of the resulting monomer mixture, 0.3 part by mass of t-hexylperoxy pivalate (trade name: Perhexyl PV) was added as a polymerization initiator to obtain a polymerizable composition. Furthermore, as a release agent, 0.05 part by mass of sodium dioctyl sulfosuccinate (trade name: AEROSOL OT-100, manufactured by Nihon Cytec Industries Inc.) was added and mixed therein followed by deaeration under reduced pressure.

A pair of glass plates with a size of 300 mm×300 mm was disposed to face each other at interval of 3 mm via a gasket made of polyvinyl chloride to form a mold. To inside the mold formed therefrom, a polymerizable composition added with the aforementioned release agent was injected. Subsequently, as a $1^{st}$ polymerization, the mold was kept in a hot bath at 80° C. for 120 minutes to carry out the polymerization. Then, as a $2^{nd}$ polymerization, it was heated for 30 minutes in a furnace with air at 130° C. to complete the polymerization. After that, the mold was cooled to room temperature, and the frame was removed to obtain an acrylic sheet with average thickness of about 3 mm. The evaluation results are shown in Table 4.

Examples 5 and 6

Figure 4:
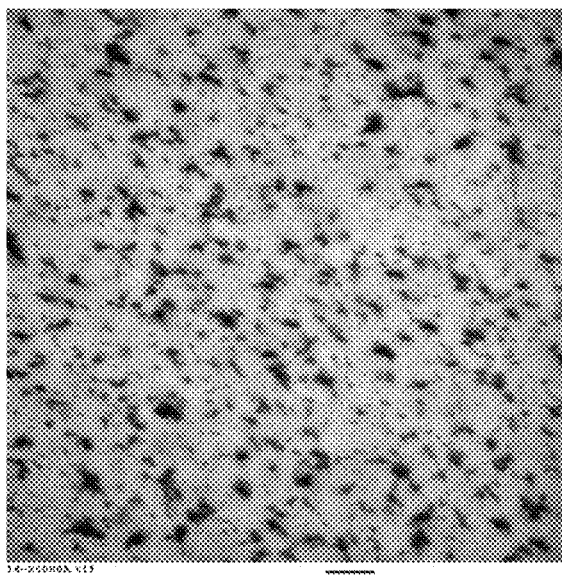
FIG. 4 is a transmission type electron microscopic image of the acrylic sheet of Example 6.

80 Parts by mass of the methyl methacrylate (A-1) as the (meth)acrylic acid ester monomer (A) and 20 parts by mass of the polybutylene glycol dimethacrylate (B-1), which is represented by the general formula (1) in which the butylene oxide group repeat number (n) is 40, as the di(meth)acrylic acid ester monomer (B) were admixed with each other to obtain a monomer mixture. To 100 parts of the resulting monomer mixture, 0.3 part by mass of 2,2-azobis-(4-methoxy-2,4-dimethylvaleronitrile) (trade name: V-70, manufactured by Wako Pure Chemical Industries, Ltd.) was added instead of t-hexylperoxy pivalate (trade name: Perhexyl PV) to obtain a polymerizable composition. Then, the polymerization was performed in the same manner as Example 4 except that the temperature of a hot bath of the 1st polymerization was changed to the temperature shown in Table 3. The evaluation results are shown in Table 4. Furthermore, a transmission type electron microscopic image of the acrylic sheet of Example 6 is shown in FIG. 4.

Examples 7 and 8

80 Parts by mass of the methyl methacrylate (A-1) as the (meth)acrylic acid ester monomer (A), 15 parts by mass of the polybutylene glycol dimethacrylate (B-1), which is represented by the general formula (1) in which the butylene oxide group repeat number (n) is 40, as the di(meth)acrylic acid ester monomer (B) and 5 parts by mass of the polybutylene glycol dimethacrylate (C-1), which is represented by the general formula (1) in which the butylene oxide group repeat number (n) is 20, as the di(meth)acrylic acid ester monomer (C) were admixed with one another to obtain a monomer mixture. To 100 parts of the resulting monomer mixture, 0.3 part by mass of 2,2-azobis-(4-methoxy-2,4-dimethylvaleronitrile) (trade name: V-70, manufactured by Wako Pure Chemical Industries, Ltd.) was added instead of t-hexylperoxy pivalate (trade name: Perhexyl PV). Then, the polymerization was performed in the same manner as Example 4 except that the temperature of a hot bath of the 1st polymerization was changed to the temperature shown in Table 3. The evaluation results are shown in Table 4.

Example 9

80 Parts by mass of the methyl methacrylate (A-1) as the (meth)acrylic acid ester monomer (A), 15 parts by mass of the polybutylene glycol dimethacrylate (B-1), which is represented by the general formula (1) in which the butylene oxide group repeat number (n) is 40, as the di(meth)acrylic acid ester monomer (B) and 5 parts by mass of the polybutylene glycol dimethacrylate (C-1), which is represented by the general formula (1) in which the butylene oxide group repeat number (n) is 9, as the di(meth)acrylic acid ester monomer (C) were admixed with one another to obtain a monomer mixture. To 100 parts of the resulting monomer mixture, 0.3 part by mass of 2,2-azobis-(4-methoxy-2,4-dimethylvaleronitrile) (trade name: V-70, manufactured by Wako Pure Chemical Industries, Ltd.) was added instead of t-hexylperoxy pivalate (trade name: Perhexyl PV) to obtain a polymerizable composition. Then, the polymerization was performed in the same manner as Example 4 except that the temperature of a hot bath of the 1st polymerization was changed to the temperature shown in Table 3. The evaluation results are shown in Table 4.

Example 10

80 Parts by mass of the methyl methacrylate (A-1) as the (meth)acrylic acid ester monomer (A), 15 parts by mass of the polybutylene glycol dimethacrylate (B-1), which is represented by the general formula (1) in which the butylene oxide group repeat number (n) is 40, as the di(meth)acrylic acid ester monomer (B) and 5 parts by mass of the polybutylene glycol dimethacrylate (C-1), which is represented by the general formula (1) in which the butylene oxide group repeat number (n) is 23, as the di(meth)acrylic acid ester monomer (C) were admixed with one another to obtain a monomer mixture. To 100 parts of the resulting monomer mixture, 0.3 part by mass of 2,2-azobis-(4-methoxy-2,4-dimethylvaleronitrile) (trade name: V-70, manufactured by Wako Pure Chemical Industries, Ltd.) was added instead of t-hexylperoxy pivalate (trade name: Perhexyl PV) to obtain a polymerizable composition. Then, the polymerization was performed in the same manner as Example 4 except that the temperature of a hot bath of the 1st polymerization was changed to the temperature shown in Table 3. The evaluation results are shown in Table 4.

TABLE 3

| | | Example 4 | Example 5 | Example 6 | Example 7 | Example 8 | Example 9 | Example 10 |
|---|---|---|---|---|---|---|---|---|
| Monomer (A) parts by mass | A-1 | 80 | 80 | 80 | 80 | 80 | 80 | 80 |
| Monomer (B) parts by mass | B-1 | 20 | 20 | 20 | 15 | 15 | 15 | 15 |
| Monomer (C) parts by mass | C-1 | — | — | — | 5 | 5 | — | — |
| | C-2 | — | — | — | — | — | 5 | — |
| | C-3 | — | — | — | — | — | — | 5 |
| Initiator | Irgacure 184 [parts by mass] | — | — | — | — | — | — | — |
| | Perhexyl PV [parts by mass] | 0.3 | — | — | — | — | — | — |
| | V-70 [parts by mass] | — | 0.3 | 0.3 | 0.3 | 0.3 | 0.3 | 0.3 |
| Release agent | Aerosol OT-100 [parts by mass] | 0.05 | 0.05 | 0.05 | 0.05 | 0.05 | 0.05 | 0.05 |
| Conditions for polymerization | Method for polymerization | Heat | Heat | Heat | Heat | Heat | Heat | Heat |
| | Illuminance [mW/cm$^2$] | — | — | — | — | — | — | — |
| | Polymerization temperature [° C.] | 80 | 60 | 40 | 60 | 40 | 40 | 40 |
| | Polymerization time [h] | 2.0 | 2.0 | 2.0 | 2.0 | 2.0 | 2.0 | 2.0 |
| Conditions for polymerization | Polymerization temperature [° C.] | 130 | 130 | 130 | 130 | 130 | 130 | 130 |
| | Polymerization time [h] | 0.5 | 0.5 | 0.5 | 0.5 | 0.5 | 0.5 | 0.5 |

TABLE 4

|  |  | Example 4 | Example 5 | Example 6 | Example 7 | Example 8 | Example 9 | Example 10 |
|---|---|---|---|---|---|---|---|---|
| Optical properties | Total light transmittance [%] | 92.3 | 84.1 | 87.1 | 91.5 | 91.6 | 91.5 | 81.2 |
|  | Haze [%] | 0.3 | 6.3 | 4.3 | 0.9 | 0.6 | 0.9 | 19.2 |
| Mechanical properties | Bending elasticity [GPa] | 1.6 | 1.6 | 1.7 | 1.7 | 1.7 | 1.9 | 1.5 |
|  | Elasticity at break [GPa] | 1.0 | 0.8 | 1.3 | 1.0 | 1.3 | 2.1 | 1.0 |
|  | Elongation at break [%] | 171.8 | 122.0 | 42.0 | 107.6 | 83.0 | 25.0 | 35.8 |
|  | Rockwell hardness | 1.7 | 16.6 | 26.4 | 27.6 | 26.0 | 36.1 | 24.3 |
|  | Charpy impact value [kJ/m$^2$] | 47.2 | 90.5 | 47.0 | 72.7 | 61.0 | 71.8 | 80.1 |
|  | DuPont impact value [J] | 2.0 | 3.9 | 2.8 | 1.8 | 1.8 | 2.0 | 3.0 |
|  | Presence or absence of whitening | ◯ | ◯ | ◯ | ◯ | ◯ | ◯ | ◯ |
| Thermal properties | Glass transition temperature [° C.] | 104 | 112 | 111 | 108 | 112 | 112 | 109 |
| Average area [nm$^2$] |  | 443 | 5370 | 13527 | 4729 | 4396 | 5514 | 17400 |
| Average diameter [nm] |  | 23 | 90 | 158 | 87 | 78 | 101 | 235 |

The acrylic sheet of Examples 4 to 10 exhibited high transparency, and excellent performance in terms of impact resistance, elongation at break, or bending.

(Chemicals that are Used)

Methyl methacrylate (trade name: Acryester M, manufactured by Mitsubishi Rayon Co., Ltd.), Polybutylene glycol dimethacrylate (represented by the general formula (1), and the repeating number of butylene oxide group is expressed as n)

1-Hydroxy-cyclohexyl-phenyl ketone (trade name: IRGACURE 184, manufactured by BASF JAPAN LTD.)

Sodium dioctyl sulfosuccinate (trade name: AEROSOL OT-100, manufactured by Nihon Cytec Industries Inc.)

INDUSTRIAL APPLICABILITY

The copolymer of the present invention has excellent properties as described above, and thus it can be preferably used as a dense optical member of a flexible display, a solar battery, an organic EL, a lighting cover, a liquid crystal display, and a light guide sheet.

The invention claimed is:

1. A dispersion-type acrylic copolymer comprising a matrix (I) formed of an acrylic copolymer with a glass transition temperature of 50° C. or higher and a polymer unit (II) formed of an acrylic copolymer with a glass transition temperature of less than 50° C., in which the polymer unit (II) forms a localized region having an average diameter of 5 to 300 nm in the matrix (I), the matrix (I) and polymer unit (II) contain units of a crosslinking component, and the content of the units of a crosslinking component is more than 2% by mass relative to the total weight of the acrylic copolymer.

2. The dispersion-type acrylic copolymer according to claim 1, wherein the localized region has an average diameter of 10 to 250 nm.

3. The dispersion-type acrylic copolymer according to claim 1, wherein the localized region has an average area of 20 to 50000 nm$^2$.

4. The dispersion-type acrylic copolymer according to claim 1, wherein the localized region has an average area of 80 to 35000 nm$^2$.

5. The dispersion-type acrylic copolymer according to claim 1, wherein the acrylic copolymer for forming the matrix (I) has a glass transition temperature of 80° C. or higher.

6. The dispersion-type acrylic copolymer according to claim 1, wherein the crosslinking component is represented by the following general formula (1):

$$CH_2=CR-COO-(X)_n-COCR=CH_2 \quad (1)$$

wherein (X) is at least one repeating unit selected from a group consisting of $C_2H_4O$, $C_3H_6O$, and $C_4H_8O$, molecular weight of $(X)_n$ is 500 or more, and R is H or $CH_3$.

7. The dispersion-type acrylic copolymer according to claim 1, wherein the crosslinking component is represented by the following general formula (2):

$$CH_2=CR-COO-(C_4H_8O)_n-COCR=CH_2 \quad (2)$$

wherein molecular weight of $(C_4H_8O)_n$ is 500 or more and R is H or $CH_3$.

8. A dispersion-type acrylic copolymer obtained by polymerizing a monomer mixture containing a (meth)acrylic acid ester monomer (A), a di(meth)acrylic acid ester monomer (B) represented by the following general formula (1) in which molecular weight of $(X)_n$ is 2500 or more, and a di(meth)acrylic acid ester monomer (C) represented by the following general formula (1) in which molecular weight of $(X)_n$ is 500 to 1800, in which mass composition of the monomer mixture is within a region surrounded by the point [60,6,34], the point [91,6,3], and the point [60,37,3] of a ternary phase diagram of [(A),(B),(C)]:

$$CH_2=CR-COO-(X)_n-COCR=CH_2 \quad (1)$$

wherein (X) is at least one repeating unit selected from a group consisting of $C_2H_4O$, $C_3H_6O$, and $C_4H_8O$ and R is H or $CH_3$.

9. A dispersion-type acrylic copolymer obtained by polymerizing, at temperature condition of 30 to 90° C., a monomer mixture containing 60 to 97.5% by mass of a (meth)acrylic acid ester monomer (A), and 2.5 to 40% by mass of a di(meth)acrylic acid ester monomer (B) represented by the following general formula (1) in which molecular weight of $(X)_n$ is 2500 or more:

$$CH_2=CR-COO-(X)_n-COCR=CH_2 \quad (1)$$

wherein (X) is at least one repeating unit selected from a group consisting of $C_2H_4O$, $C_3H_6O$, and $C_4H_8O$ and R is H or $CH_3$.

10. The dispersion-type acrylic copolymer according to claim 8, wherein (X) is $C_4H_8O$.

11. An acrylic sheet formed of the dispersion-type acrylic copolymer according to claim 1.

12. The acrylic sheet according to claim 11, wherein the sheet has a thickness of 0.01 to 30 mm.

13. The acrylic sheet according to claim 12, wherein the elongation at break is 10% or more at elongation rate of 5 mm/minute when the thickness is 3 mm.

14. The acrylic sheet according to claim 12, wherein the haze is 25% or less when the thickness is 3 mm.

15. The acrylic sheet according to claim 12, wherein the total light transmittance is 80% or more when the thickness is 3 mm.

16. A dispersion-type acrylic copolymer obtained by polymerizing a monomer mixture containing a (meth)acrylic acid ester monomer (A), a di(meth)acrylic acid ester monomer (B) represented by the following general formula (2) with n ≥35, and a di(meth)acrylic acid ester monomer (C) represented by the following general formula (2) with 7≤n≤25, in which mass composition of the monomer mixture is within a region surrounded by the point [60,6,34], the point [91,6,3], and the point [60,37,3] of a ternary phase diagram of [(A),(B),(C)]:

$$CH_2=CR-COO-(C_4H_8O)_n-COCR=CH_2 \qquad (2)$$

with the proviso that R is H or $CH_3$.

17. The dispersion-type acrylic copolymer according to claim 9, wherein (X) is $C_4H_8O$.

\* \* \* \* \*